July 25, 1939.  C. H. CUNO ET AL  2,167,322
FILTERING APPARATUS
Filed July 17, 1936  2 Sheets-Sheet 1
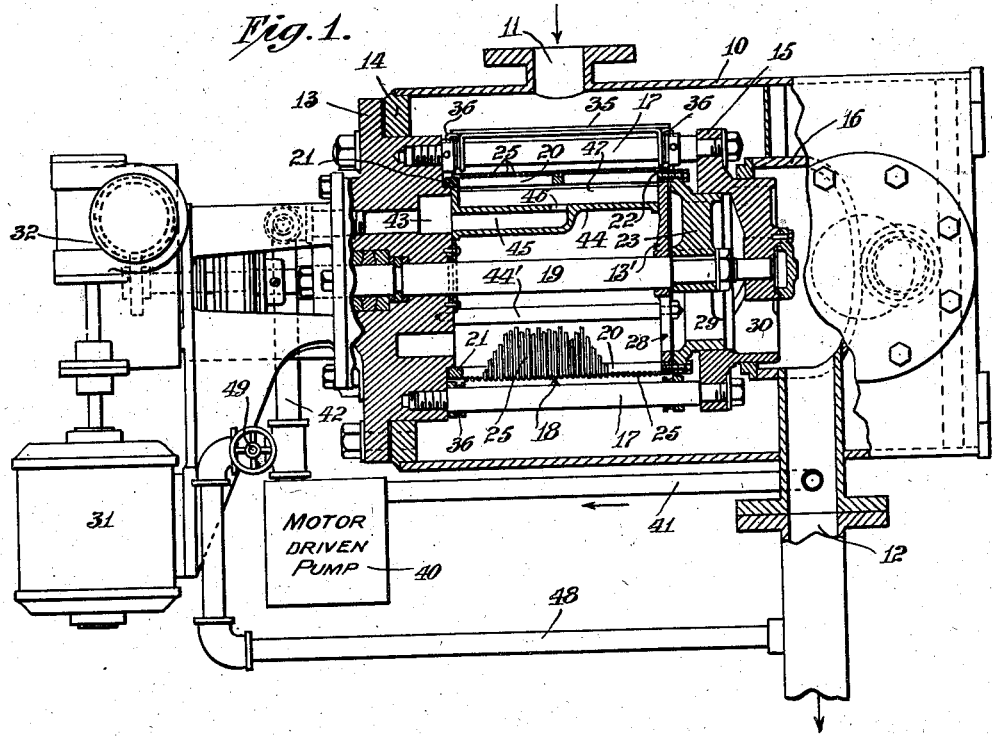
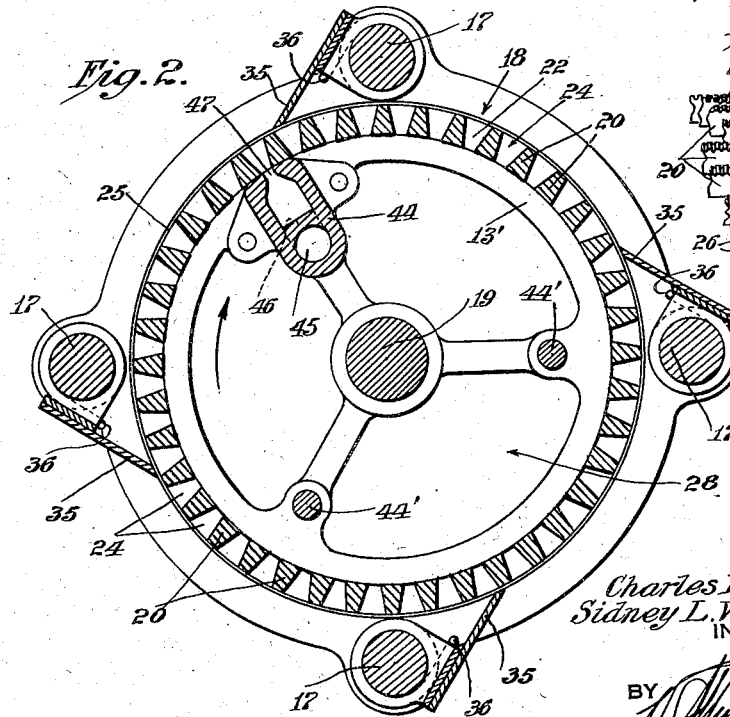
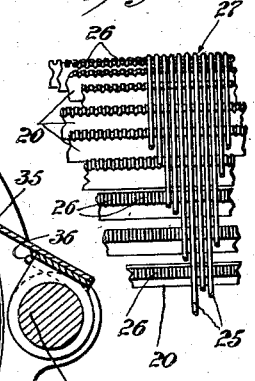
Charles H. Cuno
Sidney L. Wolfson
INVENTORS
ATTORNEY July 25, 1939.
C. H. CUNO ET AL
2,167,322
FILTERING APPARATUS
Filed July 17, 1936
2 Sheets-Sheet 2
Fig. 4.
Fig. 5.
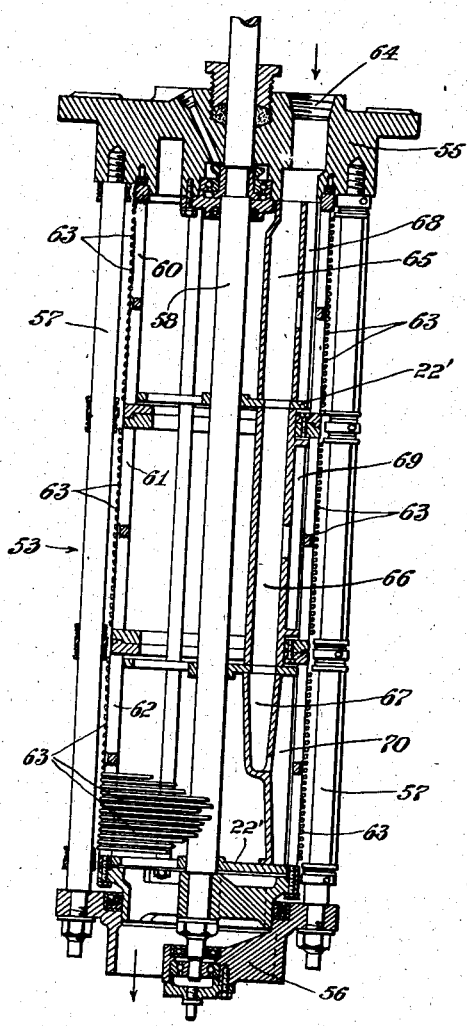
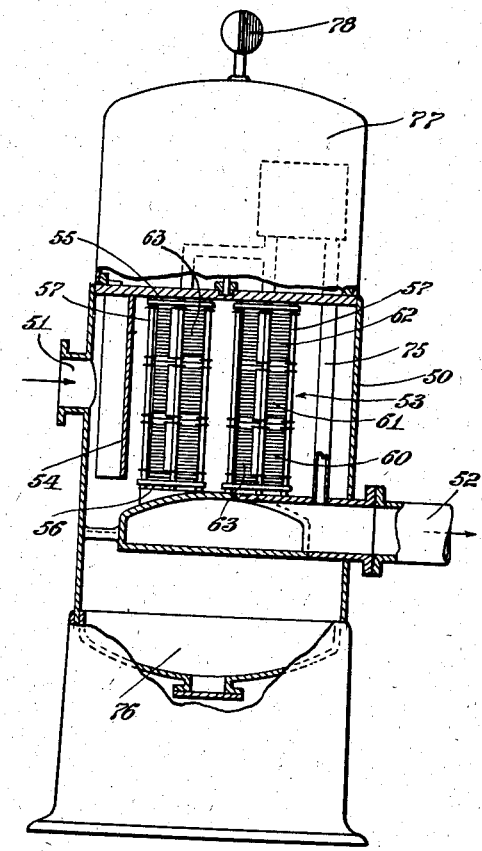
Fig. 6.
Fig. 7.
Charles H. Cuno
Sidney L. Wolfson
INVENTORS
BY
ATTORNEY Patented July 25, 1939

2,167,322

UNITED STATES PATENT OFFICE 2,167,322

FILTERING APPARATUS

Charles H. Cuno and Sidney L. Wolfson, Meriden, Conn., assignors to The Cuno Engineering Corporation, Meriden, Conn., a corporation of Connecticut Application July 17, 1936, Serial No. 91,034

3 Claims. (Cl. 210—167)

Our invention relates to apparatus particularly intended for the filtering of liquids.

One object is to provide a construction which is rugged and dependable.

Another object is to provide a construction which makes it possible to have extremely fine or small openings.

Another object is to provide a practical and reliable construction which can be readily made according to standard specifications.

Another object is to provide a construction which can be made up in various sizes.

Another object is to provide a construction which is capable of embodiment in very large sizes.

Another object is to provide a construction in which the filtering member may comprise one or more similar units enabling its length to be arranged to suit the requirements of various cases while employing one standardized unit with attendant economies in castings, patterns, machining, assembly, etc.

Another object is to provide a construction in which the filtering or straining surfaces can be readily cleaned.

Another object is to provide a construction in which the filtering or straining surfaces can be cleaned by backwashing without the necessity of providing a separate source for, or wastage of, the backwash liquid.

In commercial practice it has been common to make up filters according to four general plans. One, those embodying the use of filtering substances such as sand or other finely divided inorganic material. Another utilizing fibrous material in mass or in fabric form. Another utilizing a multiplicity of plates which are arranged with spaces between adjacent plates through which the liquid passes, and a fourth type in which wire is employed to form the straining or filtering area.

Each of these forms has a considerable field of utility but none of them is thoroughly satisfactory for filters of large size. According to our invention we provide a skeleton-like cage upon which is wound a length of wire in helical form. The liquid passes through this cage from the outside to the inside from whence it is discharged. This cage with the wire helix constitutes the filtering unit and is rotated as a part of the cleaning operation. A relatively stationary blade is located outside of the filtering unit for removing the projecting residue from the outside.

Inside of the filtering unit is located an elongated nozzle from which filtered liquid is forced in the form of a thin stream against the inside of the filtering area so as to force collected residue outwardly from between the adjacent wires as the cage rotates. The pressure of this backwash flow may be varied by controlling a pump or other means for forcing the filtered liquid back into the inlet end of the filter so that no liquid is lost.

Fig. 1 is a side view and partial section of one form of apparatus embodying our invention.

Fig. 2 is a transverse sectional view of a filter unit on a somewhat larger scale than the drawing of Fig. 1.

Fig. 3 is a view showing a fragment of the filtering element or unit.

Fig. 4 is a longitudinal sectional view of a filtering unit composed of three sections.

Fig. 5 is a side view and partial section showing filtering apparatus embodying a number of the units shown in Fig. 4 but on a smaller scale.

Figs. 6 and 7 show fragments of other forms of filtering media.

The head casting 13 of the filter is bolted to the ring 14 which forms one end of and is supported by the circumferential cylindrical wall of the casing. The header 15 fits the closer 16 which communicates with the outlet 12 at the other end of the casing. The bolts 17 connect the head 13 and the header 15 and space them at the proper distance.

Between the members 13 and 15 is rotatably mounted the filtering unit 18 whose shaft 19 has suitable bearings in the head members 13 and 15. In the form shown the filtering cylinder or cage 18 has a number of wedge shaped bars 20 which are carried by rings 21 and 22 at opposite ends. The spider 23 is keyed to the shaft 19, bolted to the ring 22 and rotates in the header 15. The spaces 24 between the adjacent bars 20 are preferably wedge shaped. The wire 25 is wound helically upon the bars 20 being located in shallow grooves 26 in the bars 20. This wire may be either of round or flattened cross section and is wound from end to end on the filtering cylinder.

The wire may be made very fine and the spacing 27 regulated by the grooving or notching of the bars 20. In case the wire is flattened at intervals as shown in Fig. 6 the grooves are unnecessary. The spider member 13' has passages 28, the ring member 23 has passages 29 and the header 15 has a number of passages 30 so that liquid which passes between the wires into the interior of the filter cylinder passes out to the discharge outlet 12. The solids are, of course, deposited on the outside of the cylinder element 18.

The filtering unit is preferably rotated automatically for instance by means of an electric motor 31 and a gear train 32 connected to the shaft 19.

A scraper blade 35 is mounted on the rod 17 and is preferably pressed by a spring 36 toward the wire 25 so as to scrape off any material from the outside as the filtering element rotates. Preferably there are a number of these scraper blades as shown in Fig. 2 arranged at intervals around the periphery of the cylinder.

The motor driven pump 40 draws filtered liquid through the pipe 41 and forces it through the pipe 42 and passage 43 into a conduit 45 which empties through an opening 46 into an elongated nozzle having an outlet 47 arranged in proximity to the inner edges of the bars 20. This conduit 45 and the nozzle 47 are secured to and supported at opposite ends by the head 13 and the spider 13'. The spider 13' is supported but does not rotate on the shaft 19 inside the ring 22 and is also connected to the head 13 by bolts 44'. By this construction a thin stream of liquid may be forced outwardly between the bars 20 and through the spaces 27 between adjacent helices of the wire screen. Thus concentrated spurts or streams of liquid force any material outwardly from the spaces in the cylinder wall so that much of the material will fall down into the casing and the balance of it will be scraped off by the action of the blades 35 as the screen rotates.

This backwash flow, of course, is at a greater pressure and in a direction contrary to the flow of the liquid which is being filtered but it occurs at only a very small part of the filtering area. In the form shown for instance there are forty of the passages 24 and the nozzle outlet 47 is so narrow that it never acts on more than one out of the forty passages at a time. Although this is a preferred arrangement it should be understood that the invention is not limited to this specific proportion as the discharge stream might act upon two or more of the passages simultaneously.

In order to adjust or vary the backwash flow and pressure we provide a bypass 48 extending from the outlet end of the filtering apparatus around the motor driven pump 40 and connected to the conduit 42 between the pump and the inlet 43 to the backwash nozzle. This bypass is controlled by a valve 49 by adjustment of which the backwash pressure may be varied.

In the form shown in Fig. 5 the filter casing 50 has an inlet 51 and an outlet 52. A number of filter units 53 such as shown in Fig. 4 are employed. A baffle plate 54 may be interposed between the inlet 51 and the adjacent filtering elements.

In this form each filter unit has a top plate 55 and a bottom or base plate 56 with connecting rods 57 (which correspond with bolts 17).

The rotatable shaft 58 carries a series of filtering sections 60, 61 and 62, each of which is similar to the filtering unit previously described. Each filter section has an outer periphery 63 of wire. The liquid to be filtered passes inwardly through the filtering areas and is discharged from the bottom of the unit through the header 56.

The filtering sections are connected together and rotate with the shaft 58 which is suitably driven. This shaft has bearings in the head members 55 and 56. Spiders 22' are supported on the shaft 58. They do not rotate but support the conduit sections in a manner similar to the action of the spider 13' in Fig. 1.

The cleaning of the unit is effected by backwash flow in a manner similar to that previously described. The filter sections are provided with conduits 65, 66 and 67 which discharge respectively into elongated nozzles 68, 69 and 70 similar to the nozzle previously described. The conduits 66 and 67 may be gradually reduced in cross section to correspond with the diminished volume of liquid to pass through.

The liquid for the backwash is pumped from the outlet side of the filter through a conduit 75 which is connected to the inlets 64 of the filter sections in a manner similar to the connection of the pump 40 in Fig. 1.

The series of filtering units may be scraped or cleaned mechanically in the same manner as the single unit in Figs. 1 and 2.

The apparatus of Fig. 5 may be provided with a sump 76 to collect the residue. The upper end of the apparatus is enclosed by a hood 77 inside of which is mounted the necessary motors, pumps, etc. (not shown). An external indicating member 78 may be provided, rotated by some element within the casing to show when the apparatus is operating.

This form of apparatus has the great advantage that it may be made in very large sizes and still retain rigidity and long life. It will be noted that the cleaning of the apparatus is carried on continuously and that there are no parts to become permanently clogged. The parts are all of long life and the apparatus is capable of being made of any capacity desired.

It will be seen that the cleaning is accomplished by clean liquid and without a loss of liquid and without the necessity of any separate supply or different kind of backwash liquid. Extremely fine spacing of the filtering wire is possible and this spacing can be readily varied in small increments to suit requirements without special expense or equipment. The backwash flow and pressure can be varied to suit any requirement by simple external bypass adjustments which need not interfere with the operation of the apparatus. The elements may be made of very large diameter without prohibitive expense or complication in construction.

Although we prefer to employ a coil of wire as the filtering area, it should be understood that certain advantages of the invention may be obtained by the use of a corrugated, fluted or perforated cylinder, a fragment of which is shown in Fig. 7.

We claim:

1. Liquid filtering apparatus including a casing with a cylindrical filtering cage inside the casing and completely immersed in liquid therein, means for forcing liquid to be filtered inwardly through said cage and means for forcing a relatively small backwash stream of the filtered liquid outwardly at a greater pressure through a part of the cage while liquid is being forced inwardly for filtering and means for moving the cage relative to the backwash stream.

2. A filter comprising stationary heads spaced apart from each other, a casing having one end secured to one head and the other end surrounding the other head, a rotatable shaft having bearings in said heads, the casing having an inlet, a screen rotatably supported by said heads and said shaft, a backwash nozzle secured to one head within the screen, a stationary spider surrounding the shaft and supporting the other end of the nozzle, an inlet through the first mentioned head to the nozzle, a closer for the other head, an outlet from the inside of the screen through the latter head into the closer, a discharge pipe leading from the closer, a pump and conduit for withdrawing a part only of the filtered liquid from the discharge pipe and forcing it through the inlet to the nozzle under greater pressure than the head of the liquid outside of the screen to clear out material from the outside of the screen by the action of the liquid forced from the nozzle through the screen as the screen rotates.

3. A filter comprising stationary heads spaced apart from each other, a casing having one end secured to one head and the other end surrounding the other head, a rotatable shaft having bearings in said heads, the casing having an inlet, a screen rotatably supported by said heads and said shaft, a backwash nozzle secured to one head within the screen, an inlet through the first mentioned head to the nozzle, a closer for the other head, an outlet from the inside of the screen through the latter head into the closer, a discharge pipe leading from the closer, a pump and conduit for withdrawing a part only of the filtered liquid from the discharge pipe and forcing it through the inlet to the nozzle and scraping means carried by the heads within the casing and coacting with the outer surface of the screen to remove material loosened by the action of the liquid forced from the nozzle through the screen as the screen rotates.

CHARLES H. CUNO.
SIDNEY L. WOLFSON.